United States Patent
Balasubrawmanian et al.

(10) Patent No.: US 7,023,471 B2
(45) Date of Patent: Apr. 4, 2006

(54) VIDEO QUALITY ASSESSMENT WITH TEST VIDEO SEQUENCES

(75) Inventors: Vivaik Balasubrawmanian, Chandler, AZ (US); Phillip G. Austin, Fountain Hills, AZ (US); Stephen Wolf, Longmont, CO (US); Margaret H. Pinson, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 09/999,541

(22) Filed: Oct. 31, 2001

(65) Prior Publication Data

US 2003/0081124 A1    May 1, 2003

(51) Int. Cl.
*H04N 17/00*    (2006.01)

(52) U.S. Cl. ...................... 348/182; 348/192

(58) Field of Classification Search ............... 348/180, 348/181, 192, 193; H04N 17/00

See application file for complete search history.

(56) References Cited

U.S. PATENT DOCUMENTS

| | | | | |
|---|---|---|---|---|
| 5,764,284 A | * | 6/1998 | Stoker | 348/181 |
| 5,978,029 A | * | 11/1999 | Boice et al. | 375/240.14 |
| 6,141,042 A | * | 10/2000 | Martinelli et al. | 348/181 |
| 6,400,400 B1 | * | 6/2002 | Isnardi et al. | 348/180 |
| 6,493,035 B1 | * | 12/2002 | Nishikawa et al. | 348/518 |

* cited by examiner

*Primary Examiner*—Michael H. Lee
(74) *Attorney, Agent, or Firm*—Blakely, Sokoloff, Taylor & Zafman LLP (57) ABSTRACT

A test video sequence for testing quality loss in processed video. When video clips are transmitted, compressed/decompressed, or otherwise processed, measuring the loss of quality that occurs during processing can be improved by inserting specific types of overhead video data into the test video sequence before processing. When the processed test video sequence is compared to the pre-processed test video sequence, the overhead video data enables improvements in the comparison operation. In one embodiment, padded areas such as uniform-color frames are inserted at specified points to absorb some of the quality loss and/or to enable identification of starting and/or ending points of the video clips. In another embodiment, a special color bar is inserted before processing and used after processing to detect changes that should be corrected before comparing the video clips.

17 Claims, 4 Drawing Sheets

VIDEO QUALITY ASSESSMENT WITH TEST VIDEO SEQUENCES

BACKGROUND OF THE INVENTION

1. Field of the Invention

The invention pertains generally to video processing. In particular, it pertains to testing video process operations using a test video sequence.

2. Description of the Related Art

The use of video information has become increasingly common in recent years. Various techniques have been developed to make the video more manageable (e.g., it may be stored, it may be transmitted over the Internet or over local data channels, etc.). In these situations, storage capacity, bandwidth limitations, real time requirements, and other factors may require the video data to be processed in some manner. For example, techniques have been developed to compress digitized video data into a smaller amount of data for efficient storage and/or transmission. A corresponding decompression process is then used to obtain a reasonable copy of the original video. Such compression/decompression techniques are usually 'lossy', e.g., the reconstituted video is not an exact duplicate of the original because of losses inherent in the compression/decompression algorithms. Similar degradations in quality may be caused by such things as packet losses during data transmission over a network, data dropout during data transmission over a congested isochronous channel, etc.

Whatever the cause of quality degradation, test tools have been developed to measure the loss in quality by comparing the original video data with the video data after it has been processed, i.e., subjected to whatever process is being evaluated for its effects on loss of quality. However, many of these test tools have a difficult time performing an accurate comparison because both processing and testing can introduce quality losses into the video that make it difficult to identify corresponding frames for the processed and pre-processed video data. Correcting for this problem so that a proper video comparison can be made can be a difficult and error-prone operation. Further complicating the process is the fact that some types of quality loss during processing or testing are indistinguishable by human viewers (e.g., shifting the entire image up and to the right by one pixel), but show up as large differences during the comparison, thereby distorting the comparison results with quality changes that are not considered important and possibly disguising other, more subtle, quality changes that are considered important.

BRIEF DESCRIPTION OF THE DRAWINGS

The invention may be best understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known structures and techniques have not been shown in detail in order not to obscure the invention.

An apparatus, system, method, and machine-readable medium for using overhead video data in a test video sequence are described. The invention may be implemented in one or a combination of hardware, firmware, and software. For instance, the invention may be implemented as instructions or data stored on a machine-readable medium, which may be read and executed or operated upon by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

In the context of the invention, the term "processing" is used to mean performing some act on a video image, video sequence, test video sequence, video clip, video frame, other video entity, or data representation of any such video entities, that can result in modification or degradation in quality of the video entity or data representation thereof. The modification or degradation may be an unintended by-product of the processing.

In the context of the invention, the adjective "pre-processed" is used to denote any of the aforementioned video entities or data representations thereof before processing, while the adjective "processed" refers to the same entities or data representations after processing.

Figure 1:
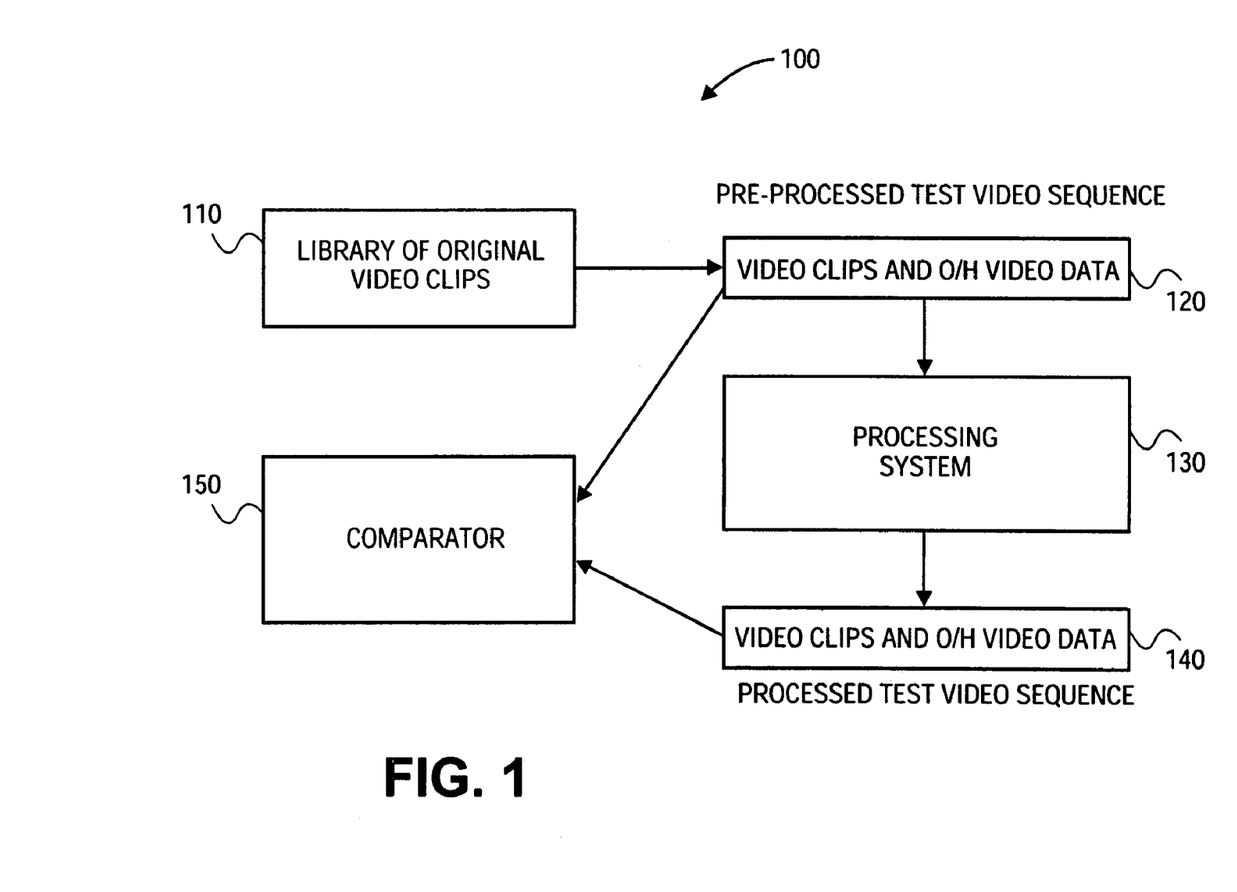
FIG. 1 shows a system to evaluate loss of quality when a test video sequence is processed, according to one embodiment of the invention.

FIG. 1 shows a system to evaluate loss of quality in a test video sequence, according to one embodiment of the invention. In system 100 of the illustrated embodiment of FIG. 1, various video clips are combined with overhead video data to form a pre-processed test video sequence (pre-processed TVS) 120. Pre-processed TVS 120 is processed by processing system 130 to produce processed test video sequence processed TVS) 140. The processed video clips of processed TVS 140 are then compared with the pre-processed video clips of pre-processed TVS 120 by comparator 150 to determine how much the video data has been changed by processing. Various embodiments add overhead video data to a sequence of one or more video clips to produce a pre-processed TVS for processing. The overhead video data may subsequently be used to aid the comparison operation. Overhead video data includes one or both of 1) at least one padded area, and 2) a special color bar area. A padded area is so named because it includes a group of multiple frames added to, and processed with, the one or more video clips but not included in the comparison operation, thus 'padding' the test video sequence. In one embodiment, the padded areas have the same format as the video clips. For example, if the frames of the video clips are represented as bit-map images composed of color pixels, the frames of the padded areas are also represented as bit-map images composed of color pixels. A special color bar area is so named because it includes a group of frames depicting a modified form of an industry-standard color bar. The special color bar area is described later in more detail.

Each padded area includes multiple pad frames having a content that makes the pad frames distinguishable from frames of the video clips and from frames of the special color bar area. In one embodiment, each padded area is made up of uniform color frames, such as gray frames. In one embodiment, a pre-processed TVS includes multiple types of padded areas, each area having frames of the same content, with the different types of padded areas being distinguished by their placement and duration. Three types of padded areas in one embodiment are: 1) leading pad frames at the front of the test video sequence, 2) trailing pad frames at the end of the test video sequence, and 3) intermediate pad frames in the interior of the test video sequence.

In one embodiment, each video clip is selected from a library 110 of video clips. In another embodiment, a pre-determined package of one or more video clips is selected from library 110. In a third embodiment, selection includes using a pre-determined set of one or more video clips without referring to a library. The video clips can be selected so that their image content is suitable for the particular type of quality testing to be performed. The video clips can be of any suitable type, such as but not limited to: 1) scenes from existing movies or films, and 2) video clips that were generated specifically for quality test purposes.

In one embodiment, some or all of the overhead video data is excluded from the comparison. The quality evaluation can be based on various criteria, such as but not limited to: lost frames, lost or modified data within frames, changes in color or brightness, and displacement of the image.

Each video clip, both pre-processed and processed, contains multiple sequential frames. In one embodiment, each video clip contains between 120 and 1800 frames to produce a video display time of 4–30 seconds, at a display rate of between 30 and 60 frames per second. Comparator 150 performs a comparison between corresponding frames of pre-processed TVS 120 and processed TVS 140. For example, in one embodiment comparator 150 compares the first frame of video clip 1 of pre-processed TVS 120 with the first frame of video clip 1 of processed TVS 140, then compares the second frame of video clip 1 of pre-processed TVS 120 with the second frame of video clip 1 of processed TVS 140, etc. Then the corresponding frames of video clip 2 are compared, and so forth until multiple corresponding video clips have been compared to determine the degradation in quality between pre-processed TVS 120 and processed TVS 140. In one embodiment, all frames of all video clips are compared. In another embodiment, only some frames of all video clips are compared (for example, the first sixty frames of each video clip). In another embodiment, all frames of only some video clips are compared. In one embodiment, which may be combined with any of the aforementioned embodiments, only a specific portion of each compared frame is compared (e.g., only a predefined center portion of the image of each compared frame). In one embodiment, the comparison is performed in real time (equal to display time). In another embodiment, the comparison is performed at a rate unrelated to display time.

To perform such frame-by-frame comparisons, TVS 120 and TVS 140 are aligned, (that is, corresponding frames of the pre-processed TVS 120 and the processed TVS 140 are identified and matched with each other). Since each subsequent frame in a video sequence may be different than the preceding frame, a frame-by-frame comparison would be meaningless without matching up corresponding frames from each TVS. In one embodiment, the first frame of the first video clip in processed TVS 140 is identified and matched with the first frame of the first video clip in pre-processed TVS 120.

Figure 2:
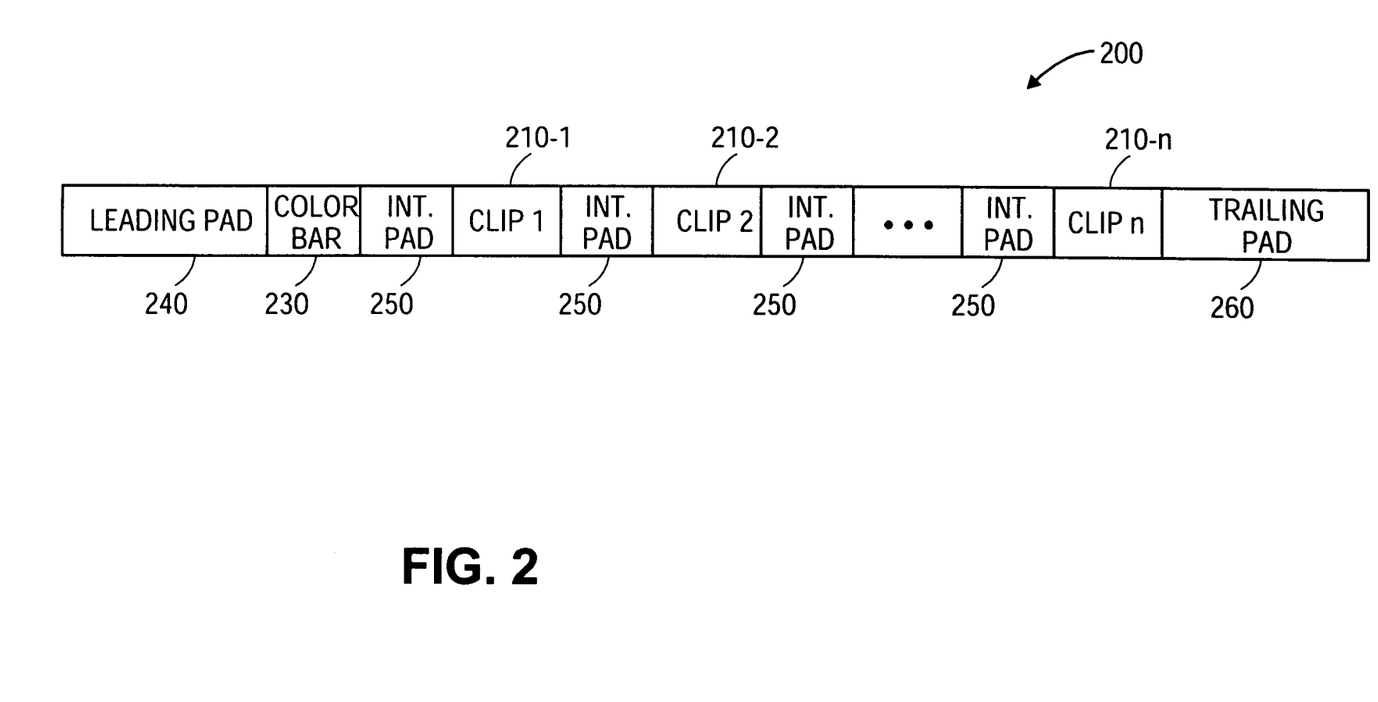
FIG. 2 shows a test video sequence according to one embodiment of the invention.

FIG. 2 shows a test video sequence according to one embodiment of the invention. The illustrated embodiment of FIG. 2 shows the following components in pre-processed TVS 120: multiple video clips 210-1 through 210-n, leading pad frames 240, special color bar frames 230, intermediate pad frames 250, and trailing pad frames 260. The arrangement of components shown in FIG. 2 for the processed TVS 120 can also be used to represent the processed TVS 140. Although a processed TVS 140 might not be exactly the same as the corresponding pre-processed TVS 120 due to changes incurred during processing, any differences are likely to be internal to the components shown and therefore not discernable in FIG. 2.

In one embodiment, the components in the pre-processed TVS 120 are contained in a data structure in which the video clips, special color bar frames, leading pad frames, intermediate pad frames, and trailing pad frames are contained in multiple files. In another embodiment, all the elements of pre-processed TVS 120 are contained in a single file.

Figure 3:
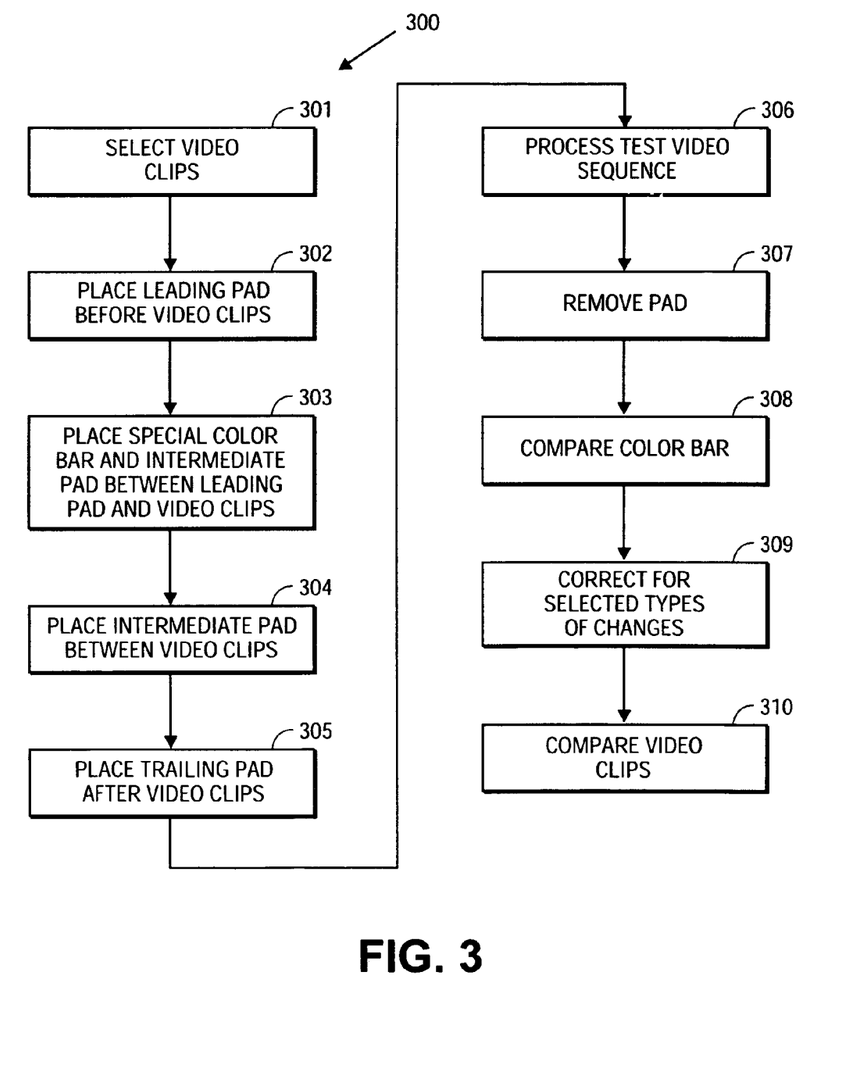
FIG. 3 shows a flow chart of a method according to one embodiment of the invention.

FIG. 3 shows a flow chart of a method according to one embodiment of the invention. By way of example, FIG. 3 will be described with reference to the exemplary test video sequences 120, 140 having the arrangement of components shown in FIG. 2. While FIGS. 2 and 3 illustrate various components and operations, it should be understood that not all embodiments require every one of these components or operations. In flow chart 300 of FIG. 3, blocks 301–305 pertain to creating a pre-processed TVS 120. In one embodiment, blocks 301–305 can be performed in a different order than shown.

With reference to FIGS. 2 and 3, at block 301 video clips 210-1 through 210-n are selected for inclusion in pre-processed TVS 120 according to any of the criteria previously described or other criteria. Although multiple video clips are shown, in one embodiment only a single video clip is selected. At block 302, leading pad frames 240 are placed in front of the first video clip 210-1. At block 303 special color bar frames 230 are placed between the leading pad frames 240 and the first video clip, while intermediate pad frames 250 are placed between the special color bar frames 230 and the first video clip 210-1. In an embodiment that does not use special color bar frames, block 303 may be eliminated.

In the illustrated embodiment of FIG. 2, the special color bar frames 230 are located between the leading pad frames 240 and intermediate pad frames 250 that precedes the first video clip. Because of distinctive differences in content, a transition from pad frames to special color bar frames permits later identification of the first special color bar frame. Similarly, a transition from special color bar frames to pad frames permits later identification of the last special color bar frame. In one embodiment, special color bar frames 230 includes enough frames for two seconds of displayable video, but other numbers of frames may also be used.

At block 304, intermediate pad frames 250 are placed between the video clips. In an embodiment that has only one video clip, block 304 may be eliminated. At block 305, trailing pad frames are placed after the last video clip. One embodiment of TVS 120 that results from performing the operations of blocks 301–305 is the illustrated embodiment of FIG. 2.

At block 306, pre-processed TVS 120 is processed to produce processed TVS 140. Processing may take various forms, as previously described. In one embodiment, processing occurs soon after TVS 120 is created. In another embodiment, TVS 120 is created and stored in a medium, to be read from the medium and processed at a later time.

Blocks 307–310 pertain to the comparison operation. In one embodiment, comparisons in blocks 307–310 between processed TVS 140 and pre-processed TVS 120 begin immediately after processing. In another embodiment, processed TVS 140 is stored in a medium, to be read from the medium and used for comparison testing at a later time.

In one embodiment, the leading, intermediate, and trailing pad frames are removed from the pre-processed TVS 120 and processed TVS 140 at block 307. In another embodiment in which block 307 is eliminated, the padded areas are not actually removed but are simply not included in the subsequent comparison. In various embodiments, the content of the frames of each padded area is the same, and each padded area serves one or more purposes depending on its relative location within the TVS and its duration. For example, these purposes and durations may include but are not limited to:

1) Leading pad frames at the beginning of a TVS may absorb synchronization losses. In some types of processing, the device generating a TVS and the device capturing the TVS may be independently operated and not synchronized with each other, so that the first portion of the generated TVS is not captured. If frames at the beginning of the TVS are lost because of this lack of synchronization, the lost frames will be missing from leading pad frames 240, and the beginning frames of video clip 1 are therefore preserved intact. In one embodiment, leading pad frames 240 includes enough frames for five seconds of displayable video, but other numbers of frames may also be used.

2) Pad frames immediately in front of a video clip or special color bar permit the first frame of the video clip/color bar to be identified. In one embodiment, because of distinctive differences in content, the transition from pad frames to the frames of a video clip/color bar aids in an identification of the first frame of the video clip/color bar. Identification of first frames in corresponding components of preprocessed TVS 120 and processed TVS 140 permits alignment to be obtained during comparison operations. In one embodiment, every video clip is preceded by an intermediate padded area to aid in identifying the first frame of each video clip, and the special color bar is immediately preceded by a leading padded area to aid in identifying the first frame of the special color bar area. In another embodiment, the first video clip is immediately preceded by the leading padded area to identify the first frame of the first video clip and no special color bar is used. If the padded areas are removed before beginning the actual frame-by-frame comparison, pointers or other markers may be associated with the files containing the video clips and special color bar to provide time alignment. In another embodiment, each video clip and the special color bar are stored in separate files after removing all padded areas. In one embodiment, only the transition from leading pad frames to special color bar frames and/or first video clip is used to identify a first frame. The first frames of all subsequent video clips are then identified by time synchronization and/or by the frame-by-frame comparison of frame content.

3) Pad frames immediately following a video clip permit identification of the last frame of the video clip and may provide sufficient delay between video clips to prevent spillover effects between two adjacent video clips. In one embodiment, because of distinctive differences in content, the transition from the frames of a video clip to pad frames enables an identification of the last frame of the video clip. The padded area immediately following a video clip also permits time for processing to complete for that video clip during the processing operation so that there is no processing spillover effect into the next video clip. In one embodiment, the processing delay experienced by each video clip through the processing operation depends upon the image content (e.g., clips with higher spatial and temporal information content can produce higher processing delays), which could cause spillover effects into processing the subsequent video clip if the subsequent video clip were to follow immediately behind the current video clip. In one embodiment, intermediate pad frames 250 includes enough frames for one second of displayable video, but other numbers of frames may also be used.

4) In one embodiment, the duration of trailing pad frames 260 permits comparator 150 to identify the end of the pre-processed TVS 120 and/or the processed TVS 140. In one embodiment, trailing pad frames 260 includes enough frames for two seconds of displayable video, so that if comparator 150 does not find the first frame of another video clip within two seconds (of display time—in one embodiment comparisons are not performed in real time) after the last frame of the previous video clip, comparator 150 determines there are no more video clips to be compared.

Returning to FIGS. 2 and 3, at block 308 the pre-processed special color bar frames are compared to the processed special color bar frames. In an embodiment in which pre-processed TVS 120 does not contain special color bar frames, block 308 may be eliminated. In one embodiment, special color bar frames 230 contain an image that differs from the industry standard color bar image by containing basic colors in known intensities and spatial information patterns to permit rapidly determining spatial and temporal shifts and gain/offset changes in the color and luminance channels. Special color bar frames 230 may be used to determine the extent of any changes in color or intensity, gain, level shift, spatial shifts, and reframing requirements. Reframing is used with interlaced video, when the processing system under test mixes up the two interlaced fields so that, for example, it outputs field 1 as field 2 of the same frame, and outputs field 2 of one frame as field 1 of the next frame. Reframing restores the fields to their proper framing relationship.

Figure 4:
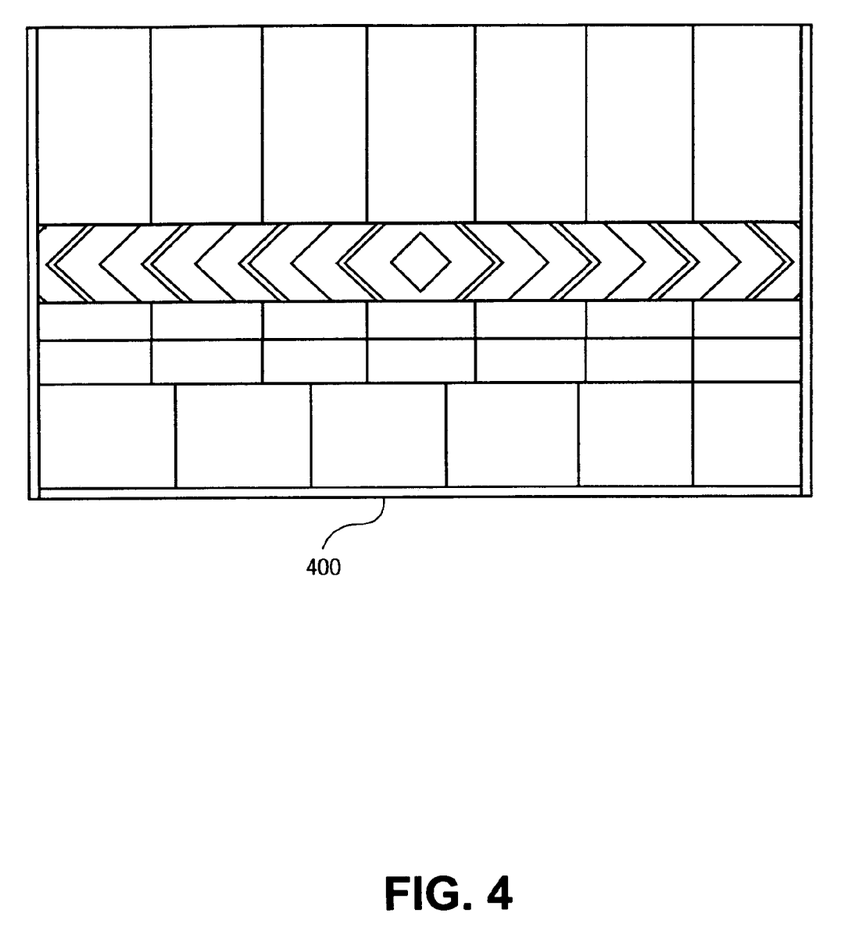
FIG. 4 shows an image for a special color bar frame according to one embodiment of the invention.

FIG. 4 shows a special color bar image, according to one embodiment of the invention. Although changes in color and spatial shifts may be measured when the video clips are compared, a special color bar containing special color bar frames with the image 400 may be more suitable for this test than the video clips, since image 400 provides the basic colors in known intensities and basic spatial information patterns in known locations. In one embodiment, processed special color bar frames are compared with pre-processed special color bar frames. In another embodiment, processed special color bar frames are compared with special color bar frames that are stored in or generated by the test equipment, thus eliminating the need to refer to the pre-processed special color bar frames.

Image 400 in the illustrated embodiment of FIG. 4 can be used to detect changes in the entire image that result from processing, changes which may show up as large differences in a comparison but which make little or no difference to the viewer and can therefore be ignored. In a quality evaluation, these detected changes can be corrected before comparison of the video chips so the changes will not show up as problems and will therefore not distort the quality score.

Such changes can include, but are not limited to, the following: 1) Small spatial shifts. In one embodiment, image 400 has specific, identifiable pixels in predetermined locations so that spatial shifts can be detected down to the single-pixel level. If the images in a video clip are shifted vertically and/or horizontally by one or two pixels, a viewer would not notice that any thing was wrong, but every pixel could potentially show up as changed in a comparison operation, resulting in a large discrepancy in a quality score. Detecting the shift, and shifting all affected pixels back to their original position before comparison of the video clips prevents this. A spatial threshold level can be set so that shifts beyond a certain number of pixels will still show up in the comparison. 2) Small changes in intensity. In one embodiment, image 400 includes a black area and a white area at a predetermined intensity, so that an overall change in intensity and/or contrast can be detected. A minor change in overall intensity can potentially show up as a change in every pixel, resulting in a large discrepancy in the quality score. Correcting for this minor intensity change before comparison of the video clips prevents this. An intensity threshold level can be set so that large changes in intensity will still be detected. 3) Small changes in relative color. Although FIG. 4 is shown in black and white, in one embodiment image 400 includes various areas in basic colors at predetermined levels with respect to each other. As before, small shifts in relative color can be detected and corrected before comparison begins so that these shifts will not distort the quality score. A color-shift threshold level can be set so that large changes will still be detected in the comparison operation.

In one embodiment, image 400 is used to detect field reversal in an interlaced video image. For example, processing might cause field 1 in an interlaced frame to be displayed as field 2 in the same frame, and cause field 2 to be displayed as field 1 in a subsequent frame. This could seriously distort all further comparison operations. In the illustrated embodiment of FIG. 4, image 400 includes a series of diagonal lines across the middle of the image. Each diagonal line proceeds at a constant angle (in one embodiment, a 45-degree angle if the pixels are square), incrementing one pixel at a time in both the vertical and horizontal directions. If the framing has been reversed during processing, the spatial location of the diagonal lines in the interlaced image will be changed. By comparing each field of the pre-processed special color bar with both fields of the processed special color bar to see which field matches, the field reversal can be detected and corrected by reframing (re-reversing the fields into their proper relationship).

Returning to FIG. 3, at block 309 corrections can be made to the processed test video sequence (or alternately, to the pre-processed test video sequence), to eliminate or reduce some or all of the differences found in block 308.

At block 310, the processed video clips are compared with the pre-processed video clips to determine a measure of quality loss introduced by the processing operation at block 306. The comparison operation may look for any of the differences previously noted herein, or other differences not previously noted.

The foregoing description is intended to be illustrative and not limiting. Variations will occur to those of skill in the art. Those variations are intended to be included in the invention, which is limited only by the spirit and scope of the appended claims.

We claim:
1. An apparatus, comprising:
a pre-processed test video sequence to be processed to produce a processed test video sequence, the pre-processed test video sequence including a set of one or more video clips; and
video overhead data having at least one padded area including at least uniform-color video frames to aid in comparison of the pre-processed test video sequence with the processed test video sequence, the comparison to evaluate video quality.
2. The apparatus of claim 1, wherein:
the at least one padded area includes leading pad frames in front of the set.
3. The apparatus of claim 2, wherein:
the leading pad frames are to absorb synchronization losses during processing.
4. The apparatus of claim 1, wherein:
the at least one padded area includes trailing pad frames behind the set.
5. The apparatus of claim 1, wherein:
the set includes first and second video clips; and
the at least one padded area includes intermediate pad frames between the first and second video clips.
6. The apparatus of claim 1, wherein:
frames of the at least one padded area are distinguishable from a first frame of one of the video clips to aid in identification of said first frame.
7. The apparatus of claim 1, wherein:
the video overhead data includes special color bar frames.
8. The apparatus of claim 7, wherein:
the special color bar frames include predetermined colors in predetermined intensities to detect a color shift between the pre-processed test video sequence and the processed test video sequence.
9. The apparatus of claim 7, wherein:
the special color bar frames include a spatial information pattern to detect a spatial shift between corresponding frames of the pre-processed test video sequence and the processed test video sequence.
10. The apparatus of claim 7, wherein:
the special color bar frames include a diagonal line pattern to detect field reversal in interlaced video between the pre-processed test video sequence and the processed test video sequence.
11. The apparatus of claim 7, wherein:
the video overhead data includes frames of the at least one padded area; and
the frames of the at least one padded area are distinguishable from a first frame of the special color bar frames to aid in identification of said first frame.
12. A system, comprising:
a pre-processed test video sequence including a set of one or more pre-processed video clips and pre-processed overhead video data;
a processing system to receive and process the pre-processed test video sequence to produce a processed test video sequence having a set of one or more processed video clips and processed overhead video data; and
a comparator coupled to an output of the processing system to perform a comparison of the set of one or more pre-processed video clips with the set of one or more processed video clips, the comparison to evaluate video quality, wherein the pad frames are not to be included in the comparison and the pre-processed test video sequence includes a color bar frame to detect changes between the pre-processed test video sequence and the processed test video sequence to be corrected before the comparison.

13. A method, comprising:

processing a pre-processed test video sequence having a color bar area and a set of one or more pre-processed video clips and pre-processed overhead video data to produce a processed test video sequence having a processed color bar area and a set of one or more processed video clips and processed overhead video data; and comparing the processed test video sequence with the pre-processed test video sequence to determine a measurement of quality for the processing by comparing the processed special color bar area with the pre-processed special color bar area and subsequently comparing the processed video clips with the pre-processed video clips.

14. A machine-readable medium containing a data structure to be operated upon by one or more processors, the data structure comprising:

a pre-processed test video sequence including a set of one or more video clips and overhead video data with at least one padded area that includes leading pad frames in front of the set of one or more video clips to absorb synchronization losses with the pre-processed test video sequence is processed, the pre-processed test video sequence to be processed to form a processed test video sequence to be compared with the pre-processed test video sequence, the comparison to evaluate video quality.

15. The medium of claim 14, wherein:

the overhead video data includes a special color bar area in front of the set of one or more video clips.

16. The medium of claim 15, wherein:

the special color bar area includes color bar frames containing an image having at least one of 1) spatial location information, 2) intensity information, 3) color level information, and 4) interlaced field frame information.

17. A machine-readable medium that provides instructions, which when executed by a set of one or more processors, cause said set of processors to perform operations comprising:

processing a pre-processed test video sequence having a pre-processed color bar area and a set of one or more pre-processed video clips and pre-processed overhead video data to produce a processed test video sequence having a set of one or more processed video clips and processed overhead video data having a processed color bar area; and comparing the processed test video sequence with the pre-processed test video sequence to determine a measurement of quality for the processing including comparing the processed special bar area with the pre-processed special color bar area and subsequently comparing the processed video clips with the pre-processed video clips.

* * * * *

UNITED STATES PATENT AND TRADEMARK OFFICE
CERTIFICATE OF CORRECTION

| | | |
|---|---|---|
| PATENT NO. | : 7,023,471 B2 | Page 1 of 1 |
| APPLICATION NO. | : 09/999541 | |
| DATED | : April 4, 2006 | |
| INVENTOR(S) | : Balasubrawmanian et al. | |

It is certified that error appears in the above-identified patent and that said Letters Patent is hereby corrected as shown below:

In column 2, at line 48, before "processed", insert -- ( --.

In column 4, at line 16, delete "discemable" and insert -- discernable --.

Signed and Sealed this

Third Day of March, 2009

JOHN DOLL
*Acting Director of the United States Patent and Trademark Office*